3,268,071
PROCESS FOR THE SEPARATION OF SOLIDS BY AGGLOMERATION
Ira E. Puddington, Ottawa, Ontario, Canada, Hilary M. Smith, Wandsworth Common, London, England, and Joseph R. Farnand, Ottawa, Ontario, Canada, assignors to National Research Council, Ottawa, Ontario, Canada, a corporation of Canada
No Drawing. Filed Aug. 22, 1962, Ser. No. 218,571
6 Claims. (Cl. 209—5)

This application is a continuation-in-part of application Serial Number 835,395, filed August 24, 1959 (now abandoned), and relates to a process for the separation of solids.

It is frequently desirable to separate mixtures of two or more solids, and there are a number of procedures, including the use of flotation treatment and centrifugal and cyclone separators, which are employed for the purpose. These known procedures are, however, costly and, in some instances, are not economically feasible for the separation of certain solids mixtures, such as those found in mining, extractive metallurgical operations, waste treatment, and generally in milling or grinding operations, the separation of which is not of practical nature unless a procedure of sufficiently low cost is employed.

It is further recognized that the rapid and clean separation of finely divided solids from liquids in which they are suspended constitutes a difficult and frequently uneconomical problem. If the solids in suspension are sufficiently valuable, centrifugal force and filtration may be used economically. However, in many industrial operations, gravity settling appears to be the only practical procedure.

It is an object of the present invention to provide a process whereby a clean separation of solid particles from a liquid suspending medium may be made economically and easily.

It is also an object of the invention to provide a method for the separate concentration of the constituents of solid mixtures in liquid suspension.

It is a further object of the present invention to provide a process for the separation of mixtures of solids which is effective in accomplishing a substantially clean separation of such solids and which may be carried out in an economical manner.

Another object is to provide a process for separation of mixtures of solids from a suspendant liquid wherein a substantially rapid, clean, gravity separation of at least one of said solids may be effected.

In one aspect of the invention, it is proposed to separate solid particles from a liquid in which they are suspended, such solid being lyophilic to the suspendant liquid. A polar conditioning agent is added to the suspension to render the surfaces of the solid lyophobic to the suspendant liquid. A bridging liquid is also added to the suspension, the solid being lyophilic to such bridging liquid. The bridging liquid is sparingly soluble or substantially insoluble in the suspendant liquid and wets the solid. It is added in amounts at least 1% by volume based on the solid and sufficient to form a film over the wetted solid particles. Thus, the bridging liquid acts to form bridges between adjacent lyophobic solid particles which tends to bond them together. The resulting mixture is subjected to mechanical agitation and turbulent conditions to flocculate the wetted particles and the agitation and turbulent conditions are continued, if necessary for an extended period, to compact the flocculates into dense spheroidal agglomerates. These agglomerates are now separated from the suspendant liquid. Since the agglomerates have low sedimentation volume and rapid settling character, they may be clearly separated from the suspension by sedimentation, screening, washing, or filtration. Since the ratio of interstitial volume to surface of the shaped, compact agglomerates increases with increasing size of the individual masses, it is possible to control the size of the masses by the quantity of bridging liquid added to the suspension. The bridging liquid is of course substantially inert chemically to the solid to be separated and to the suspendant liquid.

In accordance with a further aspect of the invention, it is proposed to separate the various solids from a mixture thereof. To this end, the mixture of solids to be separated must be in comminuted form. Thus, if the starting mixture is not in comminuted form, a comminuting step is required either as a preliminary treatment or as a substantially simultaneous phase of the invention.

It will be apparent that the comminuted form of the solids mixture bears relation to the fact that, in order to effect separation in accordance with the invention, it is necessary that each of the solids be in physically detached relation to the other solids. For instance, in the case of an iron ore containing an iron oxide and silica, it is necessary that the ore be ground to such an extent that there is a mechanical separation of the iron oxide and silica, i.e. to produce a comminuted mixture wherein the iron oxide and silica are in the form of substantially separate particles.

In accordance with the invention, the mixture of particulate solids is suspended in a liquid and initially one of the solids, if not naturally repellant to the suspendant liquid, i.e. lyophobic thereto, is made at least partially so by addition of a suitable conditioning agent; the remaining solids, if they are not already lyophilic to the suspendant liquid, are rendered so by addition of one or more suitable conditioning agents.

A bridging liquid is now added to the suspension, and the lyophobic particles separated from the suspension in the manner previously described.

The remaining suspension may now be treated by adding a polar conditioning agent thereto to render lyophobic to the suspendant liquid one of the remaining lyophilic solids. Thereafter, the latter lyophobic solid is removed in the manner previously set forth.

When the suspendant liquid is water, the one most commonly used, the bridging liquid is an organic liquid, preferably insoluble in water, for most applications not relatively volatile, and having high interfacial surface tension between it and the suspendant liquid. High density and low viscosity are frequently desirable characteristics. The organic liquid bridging agent is illustrated by nitrobenzene, an aliphatic hydrocarbon solvent such as that known under the trademark "Varsol," kerosene, petroleum lubricating oil, liquid chlorinated biphenyl, fuel oil, and combinations of them the choice being governed by the sorptive ability of the solid to be flocculated.

When the suspendant liquid is an organic liquid, such as one of those listed as illustrative of the organic bridging agent, water is the preferred bridging agent However, glycol, formamide, phenol, hydroxylated organic liquids and other liquids which are substantially insoluble in the suspending medium, may be used.

If the suspending liquid is water and it is desired to render a lyophilic solid hydrophobic, a conditioning agent selected from the group fatty acids, soluble soap and common flotation agents, may be added to the suspension.

If the suspendant liquid is organic, and it is desired to render one of the suspended solids lyophilic to the bridging liquid, a conditioning agent is added for this purpose. Tannic, lactic, formic, oleic and oxalic acids, chlorophyl, preferably in water, and an aryl dithio phosphoric acid preparation known under the trademark "Aerofloat 15" are illustrative of such conditioning agents. The conditioning agent may be added with or in the bridging liquid. The conditioning agents are generally polar compounds having both lyophobic and lyophilic groups.

As previously indicated, the bridging liquid is added in an amount at least 1% by volume based on the lyophobic solid whereby a film is produced on the lyophobic particles. While amounts of bridging liquid up to 200% by volume of the solid may be employed, the amount required will in general be below 100% and preferably below 30% more especially when good agitation is used. An excess amount of bridging liquid may result in agglomerates of smearing nature.

In accordance with a further feature of the invention, the material to be treated may be subjected to comminution or attrition simultaneously with the agitation-separation treatment described. The simultaneous comminution or attrition-agitation of material such as ores containing physically attached constituents provides and maintains good mechanical separation of such constituents from each other whereby the resultant particulate mixture may be separated in the manner described. Use of a ball or rod mill of conventional type may be employed to effect the required comminution with simultaneous subjection of the mixture to agitation and turbulent conditions.

In some instances, it may be desirable to produce mixed solid agglomerates. In such cases, the additonal solid particles which it is desired to mix with the solid to be separated, is added to the suspension during or before the agitation step, such additional solid being in lyophobic form. Thus, during the agitation step, the formed agglomerates are mixtures of the lyophobic solid to be separated and the desirable additive.

The following specific examples illustrate the operation of the process of the invention:

Example I

Graphite particles were suspended in 10 times their weight of "Varsol." Water, containing 5% of tannic acid as a conditioning agent, equivalent to 60% of the weight of the graphite was added and the mass was agitated for three minutes, when the graphite particles were all agglomerated into compact spheres of about 3 mm. in diameter which were readily removed from the suspending liquid. Similar results were obtained with graphite or carbon black suspended in benzene and with graphite suspended in "Varsol" when chlorophyl was substituted for tannic acid as the conditioning agent.

Example II

20% by weight of finely divided iron pyrites suspended in water was treated with 1% of sodium polyhydroxy stearate based on the weight of the pyrites as a surface activating or conditioning agent and 15% of nitrobenzene. Upon agitation by shaking the pyrites agglomerated into spheroids having a diameter of 1 to 5 mm. which were readily separated from the liquid. Similar results were obtained when the bridging agent was "Varsol" or petroleum lubricating oil and the conditioning agent either xanthate or polyhydroxy stearic acid.

Example III

A 10% suspension of aluminium powder in "Varsol" was agitated with 75% by weight of a 50% aqueous solution of lactic acid based on the aluminium powder. This caused the aluminium to form compact, low sedimentation volume spheroids having rapid settling character. Similar results were obtained with copper and iron powders and when either formic or oxalic acid was used as the conditioning agent.

Example IV

10% by weight of sulphur and 10% by weight of graphite suspended in "Varsol" were agitated with 60% of water based on the graphite containing 5% of tannic acid as a conditioning agent. The graphite was substantially exclusively flocculated into spheroidal masses of about 4 mm. diameter. These masses were removed from the suspension mechanically and the sulphur activated with 60% of "Aerofloat 15." 20% of water containing 15% of sodium hydroxide was then added and the mass was agitated, as a result of which sulphur balls about 1 mm. in diameter were formed. These sulphur masses were then removed from the liquid by screening.

Example V

The addition of water as a bridging liquid to a "Varsol" suspension of silica flour and sulphur with agitation resulted in flocculation and agglomeration of the silica particles. The silica agglomerates were removed and then the sulphur treated and removed as described in Example IV.

Example VI

An aqueous suspension of 10% each of graphite and calcium carbonate was agitated with the addition of nitrobenzene. The resulting graphite balls were removed by straining. Oleic acid conditioner and further nitrobenzene were added, again with agitation, whereupon the calcium carbonate agglomerated into balls and was readily removed from the liquid.

Example VII

An aqueous suspension of 10% each of graphite, zinc sulphide and calcium carbonate was made. To flocculate and separate the graphite 50% by weight of the graphite of nitrobenzene was added to the suspension and after shaking the graphite masses were screened off. The surface of the zinc sulphide particles was conditioned with 2½% of copper sulphate based on the weight of the sulphide, the pH was adjusted to 7–8, and 0.6% of secondary butyl xanthate, based on the weight of the sulphide was added. Upon the addition of a further 60% of nitrobenzene and agitation the zinc sulphide formed into spheroidal masses which were removed by screening. To separate the calcium carbonate 3% of oleic acid, as a conditioning agent, was added along with 10% of nitrobenzene as the bridging agent. Upon shaking or agitation compact masses of the calcium carbonate formed and were separated by screening or the like.

Example VIII

A coal ore comprising coal mixed with sandstone and clay in a concentration of about 10% to about 20% by weight and containing about 0.001% germanium (in the coal phase) was ground in a large excess of cold water in a ball or rod mill. Crude or residual petroleum oil (of the type of Bunker C, Lloydminster, or the like, containing sulphur compounds) was added in a concentration of about 100% by volume based on the coal solids. After 2 to 3 hours the clay and the sandstone were dispersed in the water and the coal-germanium was agglomerated into oil-bonded compact masses or spheres varying in average diameter from about ⅛" to about 1". The percentage of germanium in the coal agglomerates was found to be from 0.005 to about 0.05%. The concentration of germanium in the tailings was about 0.0004%. About 70 to 80% of total germanium was in the agglomerates.

Example IX

An iron ore from the Peace River region of Alberta, Canada, in which hydrated iron oxide (as goethite) occurred in concentric envelopes alternately with silica forming roughly spherical grains of a diameter about 1/32" to 3/16" was treated by grinding (a) with an excess of water for about a half hour in a ball mill or (b) in two passes through a colloid mill, to less than about 0.001" or −325 mesh. (a) Tall oil, or (b) acid petroleum oil was then added as a bridging liquid in varying amounts of up to about 100% by volume based on the iron oxide present. Ball mill operation was continued for about one hour and the hydrated ferric oxide was found to be agglomerated into spheres with the bridging liquid, leaving an iron-poor siliceous residue in suspension. Some calcuim carbonate was present in the ore and was also found to be concentrated with the iron oxide. This calcium carbonate is a desirable flux in subsequent refining treatment.

The results of several runs are illustrated in Table 1—

TABLE I.—SELECTIVE AGGLOMERATION OF GOETHITE

|  | Wet Analysis | | | Spectrographic | |
| --- | --- | --- | --- | --- | --- |
|  | Percent as $Al_2O_3$ | Percent as CaO | Percent as MgO | Percent as $SiO_2$ | Percent as $Fe_2O_3$ |
| Original ore | 8 | 4.5 | 3.5 | 20 | 63 |
| 1 A | 4.5 | 8 | 3 | 9 | 71 |
| B | 8.5 | 2.5 | 4 | 39 | 44 |
| 2 A | 5.5 | 10 | 3 | 11 | 74 |
| B | 8.5 | 3.5 | 4 | 30 | 58 |
| 3 A | 5 | 11 | 3 | 9 | 73 |
| B | 9 | 2 | 4 | 34 | 55 |

A = Concentrate.
B = Tailings.

The agglomerates contained from about 70 to 75% by weight of $Fe_2O_3$ compares to about 63% $Fe_2O_3$ in the original ore. The silica was reduced from about 20% in the original ore to about 10% in the agglomerates. The calcium carbonate (as CaO) was increased from about 4% in the ore to about 10% in the agglomerates. Finely ground solid organic fuel, such as coal or coke, can be added during the milling and will agglomerate with the iron oxide to form a desirable blast furnace feed.

The preliminary fine grinding (virtually to a slime) of the particular ore under treatment is necessary in order to separate mechanically the $Fe_2O_3$ and the silica since both the silica and the goethite are in very thin alternate layers. This goethite cannot be separated magnetically and even if the finely ground material were roasted to a magnetic state the mass of material would act as a unitary solid on application of the magnetic field rendering a good separation extremely difficult. With these finely divided solids a flotation separation is difficult due to the difficulty of getting attachment of the bubbles to the very small particles.

Example X

Athabasca (Alberta), Canada, tar sands, containing about 15% by weight viscous oil in finely divided silica and clay, were also treated. The sands were subjected to ball or rod milling in a large excess of cold water. After about one to three hours, the oil was found to be agglomerated and the major proportion of the silica and clay remained suspended in the water. However, it was found that as the proportion of sand in the agglomerates decreased these oil-rich agglomerates tended to smear, especially at temperatures above about 30° C. The addition of urea, or similar selective silica-dispersing conditioning agent, was found to accelerate the oil-sand separation. In order to overcome the tendency of the agglomerates to smear and to aid their recovery, it may be desirable to add about 25% to about 150% by volume based on the oil, of a solid organic fuel such as coal or coke. These solid fuel additives stiffen the agglomerates and make their separation and recovery much simpler. These resulting agglomerates are an attractive feed for a fluidized coker. A recovery of oil from the original tar sands of about 90% has been realized. The water concentration of the agglomerates is below 5%. Two specific sample treatments are summarized below.

TABLE 2.—OIL AGGLOMERATION FROM TAR SANDS

Original sand _____ 16.5% oil; 83.5% sand.

Sample 1:
    Concentrate (21% of sample
      or agglomerate _____ 72% oil; 28% sand.
    Tailings (79% of sample) __ 1.5% oil; 98.5% sand.
    Total oil recovered in
      concentrate _____ 93%.

Sample 2:
    Concentrate (19.5% of
      sample) _____ 73.5% oil; 26.5% sand.
    Tailings (80.5% of
      sample) _____ 2.5% oil; 97.5% sand.
    Total oil recovered in
      concentrate _____ 88%.
    Water content of
      concentrate _____ 3.8%.

Individual samples of concentrate gave an ash content as low as 12%.

It will be apparent that, instead of the use of coal or coke to overcome smearing and aid recovery, any finely divided solid having a hydrophobic surface may be employed. For instance, there has been satisfactorily employed a finely divided expanded polystyrene (of the type sold under the trademark "Styrofoam").

Example XI

Mixed solids from the shores of "alkali lakes" in Saskatchewan and Alberta, Canada, have been treated. The solids typically consist of Glauber's salt $Na_2SO_4.10H_2O$ mixed with clay, salt and other impurities. While the salt can be recovered by dissolving, flocculating the clay and filtering, this procedure requires recrystallization. The recrystallization can be avoided by agitating the crushed crude crystals in a saturated solution of sodium sulphate in the presence of an amine conditioner and a hydrocarbon oil bridging liquid. The contaminant which is predominantly siliceous in nature is spherically agglomerated allowing recovery of the salt crystals from the saturated and decanted suspension. The saturated salt solution can be recycled. Suitable amine conditioners are octyl, dodecyl and octadecyl amines. Octyl amine itself being a liquid constituted a desirable conditioner-bridging liquid. In one experiment the crude material was treated in a ball mill using glass balls and the siliceous impurities were collected on the glass balls.

We claim:
1. A process for the stagewise agglomeration and separation of mixtures of at least two different physically separate particulate solids selected from the group consisting of minerals and metals from a suspendant liquid, one of said solids being lyophobic and a second one of said solids being lyophilic to the said suspendant liquid, which comprises,
    (a) adding to said mixture in said suspendant liquid a bridging liquid, which preferentially wets only said lyophobic solid, and which is selected from the group consisting of nitrobenzene, an aliphatic hydrocarbon, kerosene, petroleum lubricating oil, liquid chlorinated biphenyl, fuel oil, tall oil, acid petroleum oil, and octyl amine in amounts of 1% to 100% by volume based on said lyophobic solid to form a film over said wetted lyophobic solid,
    (b) subjecting the resultant mixture to mechanical agitation and turbulent conditions to flocculate the said wetted lyophobic solid and continuing said mechanical agitation and turbulent conditions to compact the resulting flocculates into spherical agglomerates of greater density than that of said suspendant liquid,
(c) separating said agglomerates from the remaining suspension,
(d) treating said remaining suspension with a polar conditioning agent having both lyophilic and lyophobic groups for preferential adsorption thereof by said second solid to render said second solid lyophobic to said suspendant liquid,
(e) adding 1% to 100% by volume based on said second solid of one of said bridging liquids which preferentially wets said second conditioned solid,
(f) subjecting the resultant mixture to mechanical agitation and turbulent conditions to flocculate the said second conditioned solid and to compact into spherical agglomerates of greater density than that of said suspendant liquid, and
(g) separating said last-mentioned agglomerates from the remaining mixture.

2. A process for the agglomeration and separation of mixtures of at least two different physically separate particulate solids selected from the group consisting of minerals and metals from an aqueous suspendant liquid, one of said solids being hydrophobic and the second one of said solids being hydrophilic to the said suspendant liquid, which comprises,
(a) adding to said mixture in said suspendant liquid a bridging liquid, which preferentially wets only said hydrophobic solid, and which is selected from the group consisting of nitrobenzene, an aliphatic hydrocarbon, kerosene, petroleum lubricating oil, liquid chlorinated biphenyl, fuel oil, tall oil, acid petroleum oil, and octyl amine, in amounts of 1% to 30% by volume based on said hydrophobic solid to form a film over said wetted hydrophobic solid,
(b) subjecting the resulting mixture to mechanical agitation and turbulent conditions to flocculate the said wetted hydrophobic solid and continuing said mechanical agitation and turbulent conditions for at least one hour to compact the resulting flocculates into spherical agglomerates of greater density than that of said suspendant liquid, and
(c) separating by screening said agglomerates from the remaining suspension.

3. A process as defined in claim 2, including the step of adding to said suspension for subjection to said agitation and turbulent conditions an additional hydrophobic solid whereby said additional solid becomes agglomerated with said first hydrophobic solid to form mixed solid agglomerates.

4. A process for the agglomeration and separation of mixtures of at least two different physically separate particulate solids selected from the group consisting of minerals and metals from an aqueous suspendant liquid, one of said solids being hydrophobic and the second one of said solids being hydrophilic to the said suspendant liquid, which comprises,
(a) adding to said mixture in said suspendant liquid a bridging liquid, which preferentially wets only said hydrophobic solid, and which is selected from the group consisting of nitrobenzene, an aliphatic hydrocarbon, kerosene, petroleum lubricating oil, liquid chlorinated biphenyl, fuel oil, tall oil, acid petroleum oil, and octyl amine, in amounts of 1% to 30% by volume based on said hydrophobic solid to form a film over said wetted hydrophobic solid,
(b) subjecting the resulting mixture to mechanical agitation and turbulent conditions to flocculate the said wetted hydrophobic solid and continuing said mechanical agitation and turbulent conditions for at least one hour to compact the resulting flocculates into spherical agglomerates of greater density than that of said suspendant liquid, and
(c) separating by screening said agglomerates from the remaining suspension,
(d) treating said remaining suspension with a polar conditioning agent having both hydrophilic and hydrophobic groups for preferential adsorption thereof by said second solid to render said second solid hydrophobic to said suspendant liquid,
(e) adding 1% to 30% by volume based on said second solid of one of said bridging liquids which preferentially wets said second conditioned solid,
(f) subjecting the resultant mixture to mechanical agitation and turbulent conditions to flocculate the said second conditioned solid and to compact into spherical agglomerates of greater density than that of said suspendant liquid, and
(g) separating said last-mentioned agglomerates from the remaining mixture.

5. A process for the agglomeration and separation of mixtures of at least two different physically separate particulate solids selected from the group consisting of minerals and metals from an aqueous suspendant liquid, one of said solids being hydrophobic and the second one of said solids being hydrophilic to the said suspendant liquid, which comprises
(a) adding to said mixture in said suspendant liquid a bridging liquid, which preferentially wets only said hydrophobic solid, and which is selected from the group consisting of nitrobenzene, an aliphatic hydrocarbon, kerosene, petroleum lubricating oil, liquid chlorinated biphenyl, fuel oil, tall oil, acid petroleum oil, and octyl amine, in amounts of 1% to 100% by volume based on said hydrophobic solid to form a film over said wetted hydrophobic solid,
(b) subjecting the resulting mixture to mechanical agitation and turbulent conditions to flocculate the said wetted hydrophobic solid and continuing said mechanical agitation and turbulent conditions to compact the resulting flocculates into spherical agglomerates of greater density than that of said suspendant liquid, and
(c) separating said agglomerates from the remaining suspension.

6. A process for the agglomeration and separation of solids from material containing at least two different solids selected from the group consisting of minerals and metals which comprises
(a) subjecting said material to comminution and agitation in the presence of water to detach said solids from each other and form an aqueous suspension of said solids, one of said solids being hydrophobic and the remainder of said solids being hydrophilic,
(b) adding to said suspension a bridging liquid which preferentially wets only said hydrophobic solid and which is selected from the group consisting of nitrobenzene, an aliphatic hydrocarbon, kerosene, petroleum lubricating oil, liquid chlorinated biphenyl, fuel oil, tall oil, acid petroleum oil, and octyl amine, in amounts of 1% to 100% by volume based on said hydrophobic solid to form a film over said wetted hydrophobic solid,
(c) continuing said agitation of said suspension to flocculate the said wetted hydrophobic solid and to compact the resulting flocculates into spherical agglomerates of greater density than that of said suspendant liquid, and
(d) separating said agglomerates from the remaining suspension.

References Cited by the Examiner
UNITED STATES PATENTS

| Re. 22,454 | 3/1944 | Wiegand | 210—43 |
| 1,420,164 | 6/1922 | Trent | 209—49 |
| 1,491,110 | 4/1924 | Spearman | 209—164 |
| 1,667,277 | 4/1928 | Wikinson | 209—5 |

(Other references on following page)

UNITED STATES PATENTS

| | | | |
|---|---|---|---|
| 1,797,356 | 3/1931 | Martin | 209—49 |
| 1,955,121 | 4/1934 | Folke | 23—313 |
| 1,968,008 | 7/1934 | Chapman | 209—49 |
| 2,614,692 | 10/1952 | Lawver | 209—166 |
| 2,903,423 | 9/1959 | Mondria | 210—21 |
| 2,944,666 | 7/1960 | Bunge | 209—5 |
| 2,957,818 | 10/1960 | Fischer | 209—5 X |
| 3,045,818 | 7/1962 | Muschenborn | 209—5 |
| 3,071,815 | 1/1963 | Mackinnon | 264—9 |

FOREIGN PATENTS

| | | |
|---|---|---|
| 192,369 | 1/1924 | Great Britain. |
| 554,129 | 6/1943 | Great Britain. |

OTHER REFERENCES

Gaudin, Flotation, Second Edition, 1957, McGraw-Hill, page 123.

HARRY B. THORNTON, *Primary Examiner.*

R. HALPER, *Assistant Examiner.*